A. J. HOWELL.
PACKAGE FOR FOOD PRODUCTS OR THE LIKE.
APPLICATION FILED JAN. 3, 1905. RENEWED AUG. 21, 1912.

1,057,552.

Patented Apr. 1, 1913.

Witnesses.
L. M. Sangster.
Geo. A. Neubauer.

Inventor.
Alexander J. Howell.
By A. Sangster
Attorney.

UNITED STATES PATENT OFFICE.

ALEXANDER J. HOWELL, OF SYRACUSE, NEW YORK.

PACKAGE FOR FOOD PRODUCTS OR THE LIKE.

1,057,552.  Specification of Letters Patent.  Patented Apr. 1, 1913.

Application filed January 3, 1905, Serial No. 239,505. Renewed August 21, 1912. Serial No. 716,315.

*To all whom it may concern:*

Be it known that I, ALEXANDER J. HOWELL, a subject of the King of Great Britain, residing at Syracuse, in the county of Onondaga and State of New York, have invented certain new and useful Improvements in Packages for Food Products or the Like, of which the following is a specification.

This invention relates to an improved food package, such for instance, as pure unpreserved cheese and includes a thin flexible non-elastic soft tin foil, which is coated with paraffin to prevent discoloration or contamination of the food products by the metal surface and which when inclosing a food product of this character will lie closely against and in fact cling to the surface thereof, thereby effectually preventing the formation of injurious air pockets, the air in which by contacting with the unprotected surface of the food product would produce mold.

The principal object of the invention is to provide a food package having a soft non-elastic tin foil covering possessing the property of lying closely at all points against the surface of a pure unpreserved food product to prevent contact with the air and likewise to prevent the metal surface actually contacting with the food product surface to contaminate the same by coating one side of the tinfoil with paraffin.

The invention also relates to certain details of construction, all of which will be fully and clearly hereinafter described and claimed, reference being had to the accompanying drawings in some views of which a food product, such as cheese is shown incased within thin flexible tin foil coated with paraffin and in others of which greatly enlarged views of paraffin coated tin foil are shown.

Figure 2:
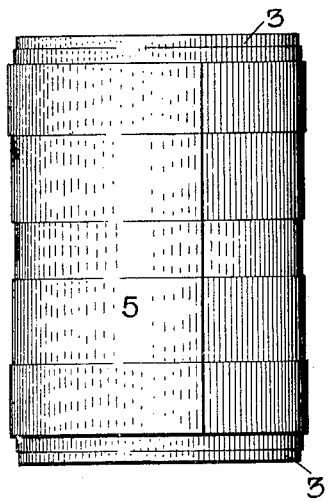
Figure 1:
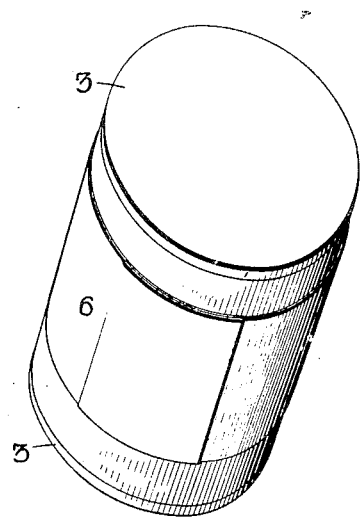
Figure 3:
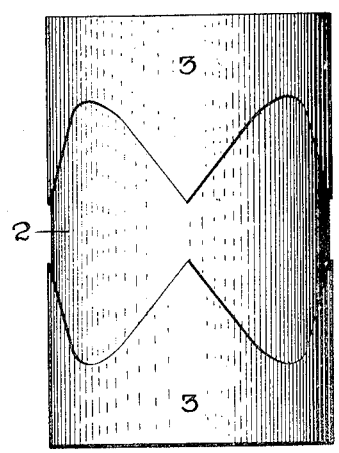
Figure 4:
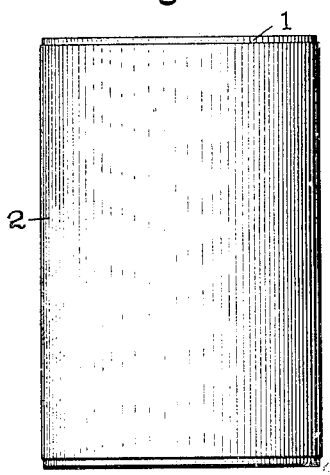
Figure 6:
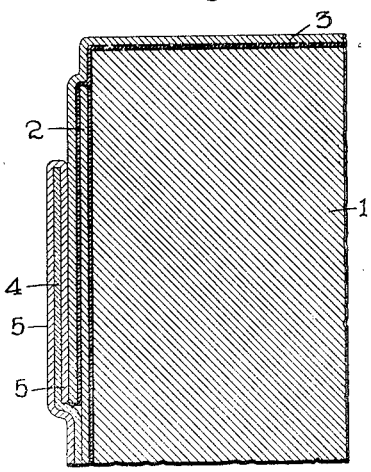
Figure 5:
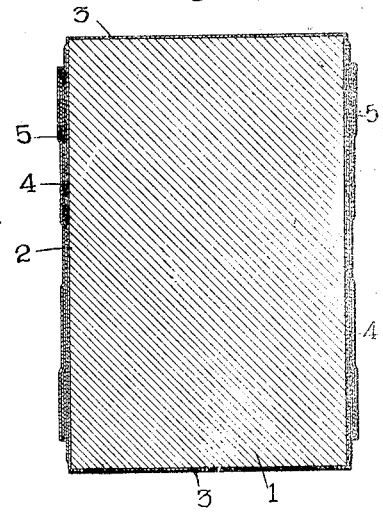
Figure 7:
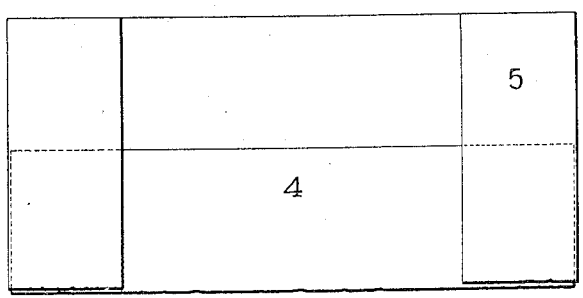
Figure 8:
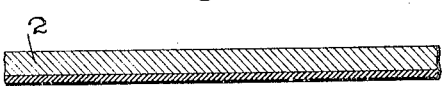

Figure 1 represents a perspective view of the food package. Fig. 2 is a side elevation of my improved package, the label being removed. Fig. 3 is a side elevation of my improved package with the outer wrapper of tinfoil and paper removed and showing the end caps in place. Fig. 4 is a side elevation of the cheese package showing the first or inner wrapper of paraffin coated tin foil. Fig. 5 is a section through the package on the line $a\,a$, Fig. 2. Fig. 6 is a greatly enlarged fragmentary section through the package, showing the relative positions of the different wrappers, the thickness of the coating of paraffin being slightly exaggerated. Fig. 7 is an enlarged fragmentary view of one end of the outer wrapper of tin foil and paper. Fig. 8 is an enlarged cross section of a piece of tin foil having one surface coated with paraffin, the thickness of the tinfoil and the paraffin being greatly exaggerated to show the relative thickness of the coating of paraffin compared to the thickness of the tin foil.

In referring to the drawings for the details of construction, like numerals designate like parts.

The package shown consists of a food product, 1, such as cheese, which is preferably in the form of a cylinder, an inner central incasing or wrapping sheet of tin foil, 2, for the cylinder, and caps 3, formed of sheets of tin foil bent over the ends of the cylinder, an intermediate sheet of paper or like flexible material 4, which is inclosed or nearly inclosed in tin foil, 5, and wrapped around the cylinder exteriorly to the inner sheet 2, and an outer paper label 6.

All of the tin foil sheets which are superimposed upon the food product are coated with a comparatively thin coat of paraffin which prevents contact of the metal surface of the tin foil with the surface of the food product and the consequent discoloration and contamination of the food product by the metal.

The principal advantages of this improved paraffin coated tin foil is that it avoids the necessity of using preservatives in the food product or of coating the surface of the food product by absolutely protecting the food product from injurious discolorations or molding.

While I have specified paraffin, I do not limit my invention specifically to paraffin, but I may employ any suitable wax or composition containing wax whereby the foregoing objects would be obtained.

I am aware that paper has been used to inclose food products but as it is elastic and stiff to a degree and does not possess the property of contacting closely with the surface, interstices are left between the food product surface and the paper surface which form air pockets and permit air to contact with and produce mold on the food product surface thereby spoiling the food product. Also plain uncoated tin foil which likewise is not suitable for the reason that the metal surface would discolor the unprotected surface of the product and thus spoil the same.

I claim,

1. An improved package consisting of an unpreserved food product which would be injuriously contaminated by contact with air and a medium for completely incasing said food product composed of a center inner covering of tin foil coated with paraffin, end caps of tin foil coated with paraffin and an outer band of paper; said center inner covering and end caps completely surrounding and covering the food product and said paraffin coated tin foil possessing the property of lying closely against the surface of the food product with the surface of the tin foil out of actual contact with and the paraffin surface in close contact at all points with said food product to absolutely inclose and protect the same from contaminating contact with air.

2. A food package in which the food is incased over its entire surface with a covering of tinfoil coated with paraffin on the inside next to the food.

3. A food package in which the food is incased over its entire surface with a covering of tin foil coated with wax-like material on the inside next to the food.

ALEXANDER J. HOWELL.

Witnesses:
L. M. SANGSTER,
GEO. A. NEUBAUER.